US010459514B2

(12) United States Patent
Yarvis et al.

(10) Patent No.: US 10,459,514 B2
(45) Date of Patent: *Oct. 29, 2019

(54) COORDINATED MULTI-DEVICE POWER MANAGEMENT

(71) Applicant: Intel Corporation, Santa Clara, CA (US)

(72) Inventors: Mark Yarvis, Portland, OR (US); Samuel Benn, Sacramento, CA (US); Soethiha Soe, Beaverton, OR (US); Mark MacDonald, Beaverton, OR (US); Dominic Fulginiti, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 15/431,578

(22) Filed: Feb. 13, 2017

(65) Prior Publication Data

US 2017/0153692 A1 Jun. 1, 2017

Related U.S. Application Data

(62) Division of application No. 14/273,613, filed on May 9, 2014, now Pat. No. 9,568,972.

(51) Int. Cl.
*G06F 1/32* (2019.01)
*G06F 1/3287* (2019.01)
(Continued)

(52) U.S. Cl.
CPC ............ *G06F 1/3287* (2013.01); *G06F 1/26* (2013.01); *G06F 1/32* (2013.01); *G06F 1/3209* (2013.01); *G06F 1/3212* (2013.01); *G06F 1/3293* (2013.01); *H04W 52/0254* (2013.01); *H04W 52/0277* (2013.01); *Y02D 10/122* (2018.01); *Y02D 10/171* (2018.01); *Y02D 10/174* (2018.01); *Y02D 70/00* (2018.01); *Y02D 70/1262* (2018.01); *Y02D 70/142* (2018.01); *Y02D 70/144* (2018.01); (Continued)

(58) Field of Classification Search
CPC .................................. H04W 52/0274
See application file for complete search history.

(56) References Cited

U.S. PATENT DOCUMENTS

| 2013/0273948 A1* | 10/2013 | Tel-Or | H04W 88/06 455/500 |
| 2014/0106677 A1 | 4/2014 | Altman | |
| 2015/0245186 A1* | 8/2015 | Park | H04W 4/80 455/417 |

FOREIGN PATENT DOCUMENTS

WO 2015127056 8/2015

OTHER PUBLICATIONS

Final Office Action dated Jul. 21, 2016 for U.S. Appl. No. 14/273,613.
(Continued)

*Primary Examiner* — Albert Wang
(74) *Attorney, Agent, or Firm* — Green, Howard & Mughal LLP

(57) ABSTRACT

Techniques related to coordinating power management for multiple devices are discussed. Such techniques may include establishing communications between devices, inventorying the components of each device, and implementing a power management plan to eliminate any redundancy in the components and reduce the total power consumed by the devices.

19 Claims, 7 Drawing Sheets

(51) Int. Cl.
*G06F 1/3293* (2019.01)
*G06F 1/3212* (2019.01)
*G06F 1/26* (2006.01)
*G06F 1/3209* (2019.01)
*H04W 52/02* (2009.01)

(52) U.S. Cl.
CPC .......... *Y02D 70/164* (2018.01); *Y02D 70/168* (2018.01); *Y02D 70/23* (2018.01); *Y02D 70/26* (2018.01)

(56) References Cited

OTHER PUBLICATIONS

Non-Final Office Action dated Jan. 11, 2016 for U.S. Appl. No. 14/273,613.
Notice of Allowance dated Oct. 7, 2016 for U.S. Appl. No. 14/273,613.

* cited by examiner

COORDINATED MULTI-DEVICE POWER MANAGEMENT

CLAIM OF PRIORITY

This application is a divisional of and claims priority to U.S. patent application Ser. No. 14/273,613, filed on 9 May 2014 and titled "COORDINATED MULTI-DEVICE POWER MANAGEMENT", which is incorporated by reference in its entirety.

TECHNICAL FIELD

Embodiments described herein generally relate to coordinating power management across multiple devices and more particularly relate to eliminating component redundancy across the devices to reduce total power consumption.

BACKGROUND

In computing devices, power management is an important feature that can provide advantages such as increased battery life, reduced energy consumption, and reduced operating costs. In particular, power management may be important in mobile devices such as smartphones, tablets, or ultrabooks or the like running on battery power. In some implementations, computing devices may manage their power by turning off unused components. For example, a device may only activate a global positioning system (GPS) component when running an application that requires location information. Once the GPS location has been determined, the GPS component (e.g., a GPS receiver) may be turned off while the device is stationary. Computing devices may also manager their power by entering low or lower power states (e.g., sleep states or the like) during periods of inactivity.

As devices continue to become more mobile and more reliant on battery power and as users become more concerned with using less power, techniques that provide for enhanced power management may be desirable.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
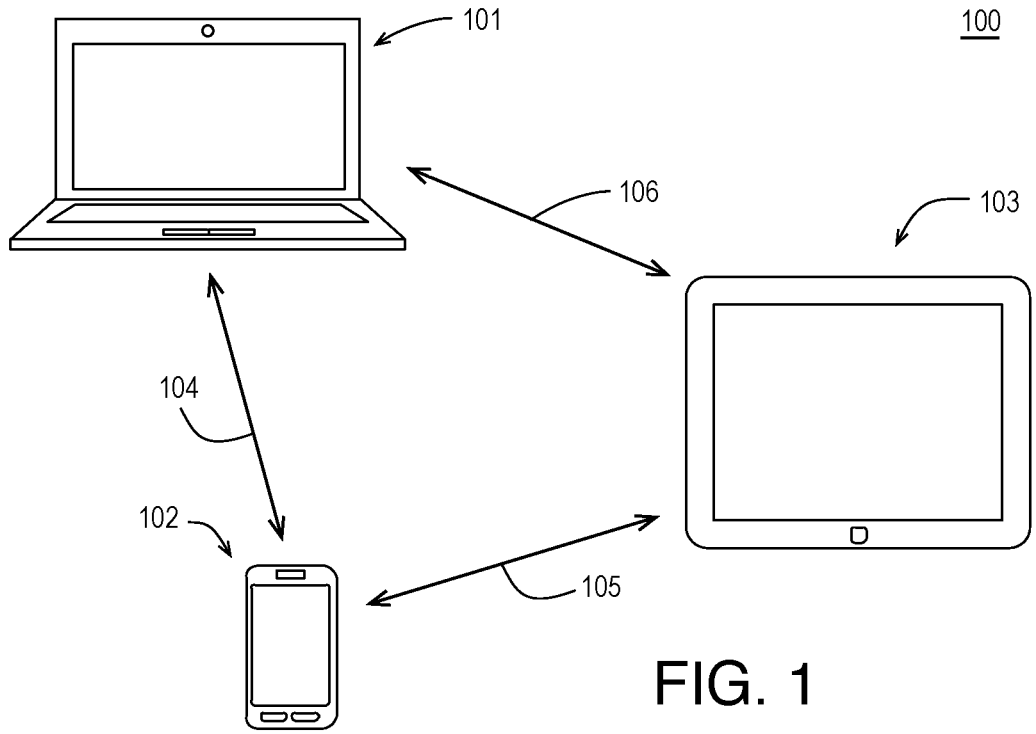
FIG. 1 is an illustrative diagram of an example system for providing power management across multiple devices.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop computers, ultrabooks, smartphones, tablets etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein.

Methods, devices, apparatuses, computing platforms, and articles are described herein related to power management and, in particular, coordinated multi-device power management.

As described above, it may be advantageous to provide power management for devices in various implementations. As discussed, power management may provide advantages such as increased battery life, reduced energy consumption, and reduced operating costs and power management may be particularly important in mobile devices such as smartphones, tablets, laptop computers, ultrabooks, or the like running on battery power.

In some embodiments, providing power management across multiple devices may include establishing one or more communicative couplings between the devices. For example, a communicative coupling may include a peer-to-peer communication channel established after a pairing of devices. One or more of the devices may inventory the components of each device of the multiple devices and generate a power management plan for the multiple devices. For example, the components may include sensors such as global positioning system (GPS) receivers, communications radios (e.g., Wi-Fi radios, third generation mobile telecommunications (3G) radios, various sensors, or the like. In an embodiment, each device of the multiple devices may inventory the components and generate a power management plan using the same techniques (such that the same power management plan is generated at each device). In another embodiment, a single device of the multiple devices may inventory the components, generate the power management plan, and communicate the power management plan to the other devices. The devices may then implement the power management plan to eliminate redundant components or the like to reduce the total power consumed by the multiple devices. For example, if a component at a first device and a component at a second device have a redundancy (e.g., perform the same or similar function), one of the devices may shut down their respective component to reduce power usage and the device may map to the component of the second device such that applications on the device may retain the functionality of the shut down component. In another example, one device of the multiple devices may enter a lower power state or the like based on the power management plan.

FIG. 1 is an illustrative diagram of an example system 100 for providing power management across multiple devices, arranged in accordance with at least some implementations of the present disclosure. System 100 may implement a method (e.g., via one or more devices of system 100) and/or platforms for providing power management across multiple devices. As shown in FIG. 1, system 100 may include devices 101, 102, 103. In the illustrated example, device 101 is an ultrabook, device 102 is a smartphone, and device 103 is a tablet; however, devices 101, 102, 103 may include any suitable devices that may be communicatively coupled and may provide multi-device power management as discussed herein. For example, devices 101, 102, 103 may include any combination of computers, laptops, ultrabooks, smartphones, tablets, or the like. In some examples, devices 101, 102, 103 may include one or more mobile devices and/or one or more devices operating on battery power. Furthermore, the illustrated example of system 100 includes three devices; however, any number of devices may be included in system 100 such as, for example, two or more devices (including, if applicable, device redundancies such as two smartphones or the like). In an embodiment, devices 101, 102, 103 may be associated with the same user or users (e.g., in a home or office or the like) or may be in a pool of devices that may share resources.

In an embodiment, device 102 (or any of devices 101, 102, 103) may inventory components and/or resources of devices 101, 102, 103. For example, the components of devices 101, 102, 103 may include modules or circuitry or the like that provide functionality for the device and that may be shut down or entered into a lower power state to reduce power consumption across system 100. For example, components may include GPS receivers, sensors, communications radios, processing resources, displays, or the like. Resources of devices 101, 102, 103 may include other characteristics of the device pertinent to the generation of a power usage plan such as, for example, applications associated with the components, whether the applications are actively running, battery power level or remaining battery life of the device, efficiency of the device in accomplishing various tasks (e.g., power used, time needed, or the like for a task or tasks), power efficiency associated with a component, or a device type (e.g., ultrabook or smartphone or the like). For example, such resources of devices 101, 102, 103 may be pertinent to saving power (e.g., usage may be diverted to device having a greater remaining battery life, a more efficient device may be used for a task, etc.) or increasing a user experience in implementing the power management plan.

Based on the inventory of components and/or resources of devices 101, 102, 103, one or more of devices 101, 102, 103 may generate a power management plan based on the inventory of components and/or resources. For example, the power management plan may eliminate a redundancy and reduce the total power consumed by the devices of system 100. Reducing the total power consumed by the devices of system 100 may include reducing power based on the eliminated redundancy and/or placing a device into a lower power state. Furthermore, reducing the total power consumed may include redirecting component usage to devices having greater remaining power, more efficiency, a better user experience, or the like.

In one example, a user may be travelling with a smartphone (e.g., device 102), a tablet (e.g., device 103), and an ultrabook (e.g., device 101). In such an example, device 102 and device 103 may each include a GPS receiver. Furthermore, a variety of applications (e.g., map applications, review service applications, social networking applications, camera applications, or the like) available and/or running on device 102 and device 103 may use location information received by invoking their respective GPS receivers.

In such an example, one or more of devices 101, 102, 103 may establish communicative couplings 104, 105, and/or 106 and inventory components and/or resources of devices 101, 102, 103. Based on the inventory, one or more of devices 101, 102, 103 may generate a power management plan for devices 101, 102, 103 and devices 101, 102, 103 may implement the power management plan. Continuing the example, the inventory may identify a GPS receiver of device 102 and a GPS receiver of device 103, which may be redundant within system 100. The power management plan may select one of the GPS receivers for use within system 100 and the other GPS receiver may be shut down or disabled to reduce the total power consumed by system 100. For example, the GPS receiver of device 103 may be selected based on device 103 having more remaining battery power or a more efficient GPS receiver or the like. By implementing the power management plan, the GPS receiver of device 102 (and of device 101, if available) may be shut down and any location information for system 100 may be provided via the GPS receiver of device 103. For example, applications running on device 102 that need location information may obtain the location information via the GPS receiver of device 103 through a component mapping via communicative coupling 105.

In another example, a user may be at their personal computer, laptop, or ultrabook (e.g., device 101), which may be wall-powered or plugged in (e.g., on AC power) and may be running a variety of applications. Furthermore, the user may have a smartphone (e.g., device 102). For example, both device 101 and device 102 may be running an email application, which may be fetching emails from a server over a wireless communications channel such as a Wi-Fi channel or the like.

In such an example, one or more of devices 101, 102, 103 may establish communicative couplings 104, 105, and/or 106 and inventory components and/or resources of devices 101, 102, 103 as described and, based on the inventory, one or more of devices 101, 102, 103 may generate and implement a power management plan for devices 101, 102, 103. Continuing the example, the inventory may identify a communications radio of device 101 and a communications radio of device 102, which may be redundant within system 100. In this example, the redundancy may be a redundancy of functionality (e.g., communications) and, as in other embodiments discussed herein, the redundancy need not be provided by identical or nearly identical components. For example, the redundancy may include device 101 being on Wi-Fi or coupled to a wired Ethernet network and device 102 being on a 3G or LTE wireless or the like. In any event, the power management plan may select one of the communications connections for use within system 100 and the other communications connection may be shut down, disabled, or idled or the like to reduce the total power consumed by system 100. For example, the communications connection of device 101 may be selected based on device 101 being plugged in, having more remaining battery power, a communications connection with a wider bandwidth or a lower user fee, or the like. By implementing the power management plan, the communications connection of device 102 (and of device 103, if applicable) may be shut down, disabled, or idle and any communications connection for system 100 may be provided via the communications connection of device 101.

Alternatively, or in addition, device 102 itself may be put into a lower power state (e.g., standby or sleep mode or the like) based in part on the power management plan. For example, if all components of device 102 are unused based on using a component of device 101 (e.g., the communications connection as discussed) and/or based on no applications of device 102 invoking the various components of device 102 (e.g., no GPS receiver is being used as the user is not moving, no processing resources are being utilized, and so on), then device 102 may enter a lower power state. Device 102 may be entered into the lower power state based on the power management explicitly directing device 102 to enter the lower power state or device 102 may enter itself into the lower power state based on its components being disabled. For example, device 102 may determine it is idle and may enter into the lower power state based on that determination.

In another example, a user may be on a piece of exercise equipment such as an exercise bike or the like. The piece of exercise equipment may be wall-powered or plugged in and may include a sensor such as a heart rate monitor. Furthermore, the user may have a watch that also has a heart rate monitor. In such an example, the piece of exercise equipment and the watch may establish a communicative coupling and inventory components and/or resources of the piece of exercise equipment and the watch as described and, based on the inventory, one or both may generate and implement a power management plan. For example, the inventory may identify the heart rate monitors as redundant. The power management plan may select one of the heart rate monitors for use and the other heart rate monitor may be shut down, disabled, or idled or the like to reduce the total power consumed. For example, the heart rate monitor selected for use may be selected based on the piece of exercise equipment being plugged in, based on the selected heart rate monitor's accuracy, or the like.

In some examples, one or more of devices 101, 102, 103 may be wall-powered or plugged in (e.g., AC powered). Furthermore, in some examples, if one or more of devices 101, 102, 103 becomes AC powered, it may auto select itself first (e.g., for use of local components as is discussed further herein) even if another device is also AC powered. In other examples, if the device becomes AC powered it may still offload to another AC powered device if that device has additional capabilities (e.g., a larger bandwidth communications capability) or more efficient capabilities.

Returning to FIG. 1, as shown, one or more communicative couplings 104, 105, 106 may be established among devices 101, 102, 103. For example, communicative coupling 104 may be established between device 101 and 102, communicative coupling 105 may be established between device 102 and 103, and communicative coupling 106 may be established between device 101 and 103. In some examples, each of devices 101, 102, 103 may inventory the components and/or resources of devices 101, 102, 103 and each may generate a power management plan based on the inventory. In such examples, communicative couplings 104, 105, 106 may all be needed as each of devices 101, 102, 103 needs to communicate with the other devices of system 100 to generate the inventory.

In other examples, one or only some devices of system 100 may inventory the components and/or resources of devices 101, 102, 103. In such examples, not all of devices 101, 102, 103 may need to communicate with each other. For example, if device 101 is selected to inventory the components and/or resources of devices 101, 102, 103, then communicative coupling 104 and communicative coupling 106 may be established while communicative coupling 105 may not be needed. For example, device 101 may inventory the components and/or resources of devices 101, 102, 103 via communicative couplings 104, 105 and transmit the inventory list to devices 102, 103 via communicative coupling 104.

Similarly, in some examples, one or only some of devices 101, 102, 103 may generate a power management plan. Again, in such examples, not all of communicative couplings 104, 105, 106 may be needed. For example, if device 101 is selected to generate and communicate the power management plan, then communicative coupling 104 and communicative coupling 106 may be established while communicative coupling 105 may not be needed. For example, device 101 may generate the power management plan and transmit it to devices 102, 103 via communicative coupling 104.

Communicative couplings 104, 105, 106 may include any communicative coupling that may provide communications between two or more of devices 101, 102, 103. For example, communicative couplings 104, 105, 106 may include a peer-to-peer communications channel, a local area network, a personal area network, a body area network, or the like. As shown, devices 101, 102, 103 may communicate wirelessly; however, some devices of system 100 may communicate over a wired network such as an Ethernet network or a wired connection such as universal serial bus (USB) connection or the like. Furthermore, communicative couplings 104, 105, 106 may include any suitable communications techniques and/or protocols including wireless communications protocols such as Bluetooth, Infrared Data Association, Wi-Fi (e.g., wireless local networking based on the Institute of Electronics Engineers (IEEE) 802.11 standards), body area networking based on IEEE standard 802.15.6, or the like.

In some examples, the establishment of communicative couplings 104, 105, 106 may be in response to a trigger (e.g., a trigger to provide multi-device power management) at one or more of devices 101, 102, 103, devices 101, 102, 103 entering an active power state, and devices 101, 102, 103 enabling device-to-device communications. For example, the device-to-device communications may include the devices being discoverable and a discovery process or protocol such as zero-configuration networking (zeroconf) or universal plug and play (UPnP), or the like being implemented. For example, establishing communicative couplings 104, 105, 106 may include a pairing or enrollment process to establish devices 101, 102, 103 belong to the same user(s) or same pool of devices or the like.

As discussed, one or more communicative couplings 104, 105, 106 may be established between devices 101, 102, 103. Also, as discussed, one or more of devices 101, 102, 103 may inventory components and/or resources of devices 101, 102, 103, and one or more of devices 101, 102, 103 may generated and/or implement a power management plan based on the inventory of components and/or resources. For example, the power management plan may be implemented at a local device and remote devices simultaneously.

Figure 2:
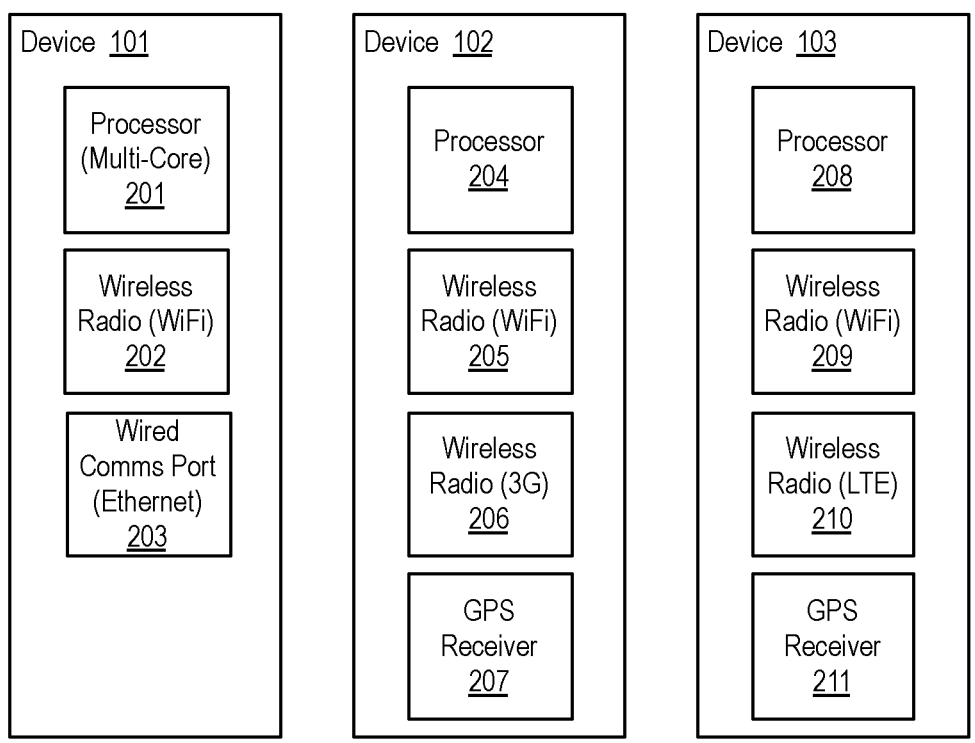
FIG. 2 is an illustrative diagram of example device components.

FIG. 2 is an illustrative diagram of example device components, arranged in accordance with at least some implementations of the present disclosure. As shown in FIG. 2, devices 101, 102, 103 may have components available for use by the respective device. For example, device 101 may include a processor 201 (e.g., a multi-core processor), a wireless radio 202 (e.g., a Wi-Fi radio), and/or a wired communications port 203 (e.g., an Ethernet port); device 102 may include a processor 204, a wireless radio 205 (e.g., a Wi-Fi radio), a wireless radio 206 (e.g., a 3G radio), and/or a GPS receiver 207, and device 103 may include a processor 208, a wireless radio 209 (e.g., a Wi-Fi radio), a wireless radio 210 (e.g., an LTE radio), and a GPS receiver 211.

Devices 101, 102, 103 are illustrated with the described components for the sake of clarity of presentation; however, devices 101, 102, 103 may include any components as discussed herein in any combination such that a redundancy of functionality may be determined across system 100. For example, devices 101, 102, 103 may include any combination of GPS receivers, sensors, wireless communications radios, processing resources, displays, or any other component(s) discussed herein. Such components may be inventoried as discussed and/or resources or characteristics of devices 101, 102, 103 may be inventoried for utilization in generating a power management plan, as is discussed further below.

Figure 3:
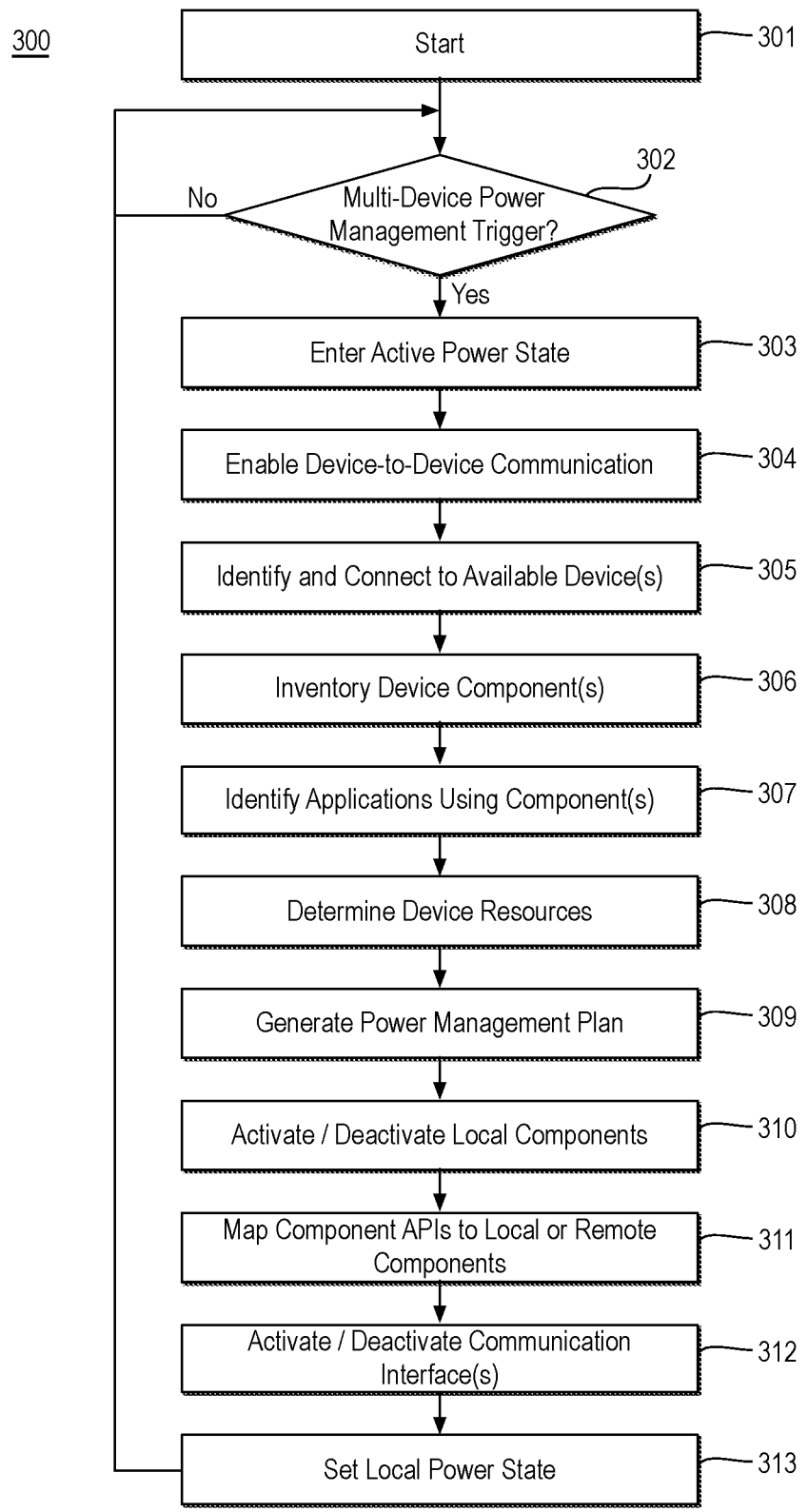
FIG. 3 is a flow diagram illustrating an example process for providing power management across multiple devices.

FIG. 3 is a flow diagram illustrating an example process 300 for providing power management across multiple devices, arranged in accordance with at least some implementations of the present disclosure. Process 300 may include one or more operations 301-313 as illustrated in FIG. 3. Process 300 may form at least part of a process for providing power management. By way of non-limiting example, process 300 may form at least part of process for reducing the total power consumed by system 100 as discussed herein.

As shown in FIG. 3, process 300 may begin at start operation 301, "Start", where the power management techniques as discussed herein may begin. For example, power management settings may be enabled or activated (e.g., as a factory setting, software setting, or user selected setting) within one or more of devices 101, 102, 103. In various examples, process 300 may be performed by one device or multiple devices in concert. Further, the operations of process 300 may be performed in parallel, in series, or a combination thereof.

Processing may continue at decision operation 302, "Multi-Device Power Management Trigger", where a determination of whether a multi-device power management trigger has occurred may be made by one or more of devices 101, 102, 103. As shown, if no trigger is detected, process 300 may return to decision operation 302. If a trigger is detected, process 300 may continue at operation 303 as is discussed further below. The multi-device power management trigger or power management trigger may be any suitable trigger that indicates a multi-device power management evaluation may be advantageous. For example, the multi-device power management trigger may be a periodic trigger occurring at regular intervals or the like. The periodic trigger may have any period such as, for example, five minutes, ten minutes, twenty minutes, one hour, or the like. In an example, the periodic trigger interval may be user defined. In another example, the periodic trigger may vary based on an activity state of the device (e.g., a more active device may have a more frequent periodic trigger), components or software running on the device, or the like.

In another example, the power management trigger may be a user initiated trigger. For example, one or more of devices 101, 102, 103 may provide a user selection option or button or the like that may allow a user to select a power management mode or multi-device power management mode or trigger or the like. Such a selection may be advantageous to a user seeking to save power or a user with a device that is running low on battery power, for example.

In yet another example, the power management trigger may be a device change or a change in status trigger. For example, a device change or change in status trigger may include a device entering or exiting system 100 or a change in the resources of one or more device such as, for example, a device meeting a low battery power status (e.g. half power or 20% power remaining or the like), a device running a predefined component or number of components, or the like.

In some examples, the power management trigger available at a device may depend on the device capability or platform of the device. For example, some devices include power management platforms that may include or indicate power states or component statuses that may be used to generate power management triggers. In such instances, change in status triggers based on device characteristics may be available, for example. In other examples, some devices may include low energy communications platforms (e.g., Bluetooth or the like) that may detect other devices. In such instances, change in status triggers based on other devices entering or exiting the system may be available. However, other devices may not include such platforms and, for example, may only enable periodic triggers and/or user defined triggers.

In such examples, the operations of process 300 may be initiated at various devices based on their enabled or allowed triggers and the operations may be performed by two devices in concert while, for example, a third and fourth devices are not yet triggered. In such an example, a power management plan based on the two available devices may be generated and implemented. At subsequent iterations of the operations of process 300, additional devices may be added to the power management plan as they become triggered and/or available. In an embodiment, such trigger availability may be added to the resources inventory as discussed herein and incorporated into the power management plan to optimize the number of available devices, the reduction of redundancy, and the reduction of power consumption as discussed herein. For example, an interval or timing may be set by the power management plan when all devices will be available for communication simultaneously.

Processing may continue at operation 303, "Enter Active Power State", where one or more of devices 101, 102, 103 may enter an active power state. For example, one or more of devices 101, 102, 103 may enter an active power state from a lower power state such as a standby mode or a sleep mode or the like. In an example, entering an active power state may include one or more of the components of the device (e.g., device-to-device communications components) entering an active power state. In an example, entering an active power state may be substantially unnoticeable to a user. In an example, entering an active power state may include waking the device.

Processing may continue at operation 304, "Enable Device-to-Device Communication", where one or more of devices 101, 102, 103 may enable device-to-device communication. For example, enabling device-to-device communications may include enabling a communications radio (if previously disabled), making the device discoverable, and/or initiating a discovery process or protocol.

Processing may continue at operation 305, "Identify and Connect to Available Device(s)", where one or more of devices 101, 102, 103 may establish one or more of communicative couplings 104, 105, 106 as discussed herein. In some examples, each device may be communicatively coupled to every other device of system 100. In other examples, one or some of the devices may be communicatively coupled such that one or some of the devices may generate an inventory and/or power management plan and provide the inventory and/or power management plan to the communicatively coupled device such that every device in the system generates or obtains the inventory and/or power management plan. For example, at operation 305, one or more of devices 101, 102, 103 may identify and/or connect to a set of user devices or a shared pool of devices or the like.

Processing may continue at operation 306, "Inventory Device Component(s)", where one or more of devices 101, 102, 103 may inventory the components of devices 101, 102, 103 as discussed herein. For example, the components may include modules or circuitry or the like that provide functionality for the respective device as discussed herein. Furthermore, a portion of the components may be available for shut down or a lower power state to reduce power consumption. As discussed, example components include GPS receivers, sensors, wireless communications radios, processing resources, and displays; although other components may be available and inventoried.

Processing may continue at operation 307, "Identify Applications Using Component(s)", where one or more of devices 101, 102, 103 may identify and/or inventory the applications of devices 101, 102, 103 that are associated with the components (e.g., that may use the components) and/or applications that are actively using the components.

In an example, the applications may be considered resources of the devices as discussed herein. In other examples, the applications may be inventoried separately with respect to other device resources. The applications may be identified via devices 101, 102, 103 and communicated among devices 101, 102, 103 via communicative couplings 104, 105, 106 in any manner as discussed herein.

Processing may continue at operation 308, "Determine Device Resources", where one or more of devices 101, 102, 103 may determine and/or inventory the resources of devices 101, 102, 103. As discussed, resources may include characteristics of the device pertinent to the generation of a power usage plan such as, for example, remaining battery power or remaining battery duration of the device, efficiency of the device in accomplishing various tasks (e.g., power used, time needed, or the like for a task or tasks), power efficiency associated with a component, or a device type (e.g., ultrabook or smartphone or the like). In some examples, a weighting may be applied to the various resources such that their importance may be determined and factored into the power management plan. In an embodiment, a primary resource of devices 101, 102, 103 for the generation of the power management plan is the available battery power of the device.

Processing may continue at operation 309, "Generate Power Management Plan", where one or more of devices 101, 102, 103 may generate a power management plan. As discussed, in some examples, each of devices 101, 102, 103 may generate the power management plan. In such examples, each device may generate the power management plan based on a distributed resource planning technique that may be performed by any of devices 101, 102, 103. For example, the distributed resource planning technique may be performed in the same manner on each device and on the same inventory on each device to generate the same resultant power management plan. Using such a distributed resource planning technique, devices 101, 102, 103 may be orchestrated or synchronized to generate and implement the same power management plan to provide an optimal result for system 100.

In other examples, one or some of devices 101, 102, 103 may generate the power management plan and the resultant power management plan may be communicated or transmitted to those devices that did not generate the power management plan. In examples where more than one device generates the power management plan, a distributed resource planning technique (e.g., each of those devices using the same technique on the same information to produce the same resultant power management plan may be used). Using such techniques, some devices may not need to generate the resultant power management plan (e.g., due to a lack of communicative coupling, very low power resources, or the like) while conformity of the power management plan may still be ensured.

In examples where one device generates the power management plan and distributes the power management plan to all other devices of system 100, a centralized resource planning technique may be used such that one device inventories the components and/or resources, generates the power management plan, and transmits the power management plan to other devices. For example, such techniques may be advantageous when communicative couplings are limited to being through just one device, when only one device has the platform or capability to generated a power management plan, when only one device has an updated power management plan generation revision, or the like. In an embodiment, a centralized resource planning technique may be implemented via a central planner device of system 100. In some examples, where a centralized resource planning technique is used, the technique(s) used to generate the power management plan may be the same as those used in distributed resource planning technique(s) and, in other examples, the techniques may be different.

Generating the power management plan may include any technique or techniques that provide for eliminating redundancies in the functionality of components and/or for providing components usage models that reduce total power consumed by system 100. In some examples, the power management plan may also move power usage to one or more devices 101, 102, 103 with a greater power level, a longer duration until battery failure, more efficiency in completing tasks associated with a particular component, or the like.

As discussed herein, eliminating a redundancy may include eliminating any redundant functionality of components and a redundancy does not require an exact or even a substantially exact duplication of components. For example, a redundancy may be provided by two components that provide device location, two components that provide GPS data, or two components that are the same GPS circuitry. In any event, a redundancy may exist and such examples illustrate that as used herein a redundancy is associated with a redundant functionality being duplicated with respect to system 100. For example, a redundancy may be provided by heterogeneous components. The discussed redundancies may be determined in any suitable manner. For example, the inventory of components may include, for each component, a model name, a model identifier, a serial number, a part number, a manufacturer, a version number, a chip or chipset identifier number, a functionality descriptor, or any other identifier associated with the component such that components may be compared for a redundancy. For example, generating the power management plan may include categorizing and/or comparing the components for a redundancy. In some examples, a user may define one or more components that are available for shut down (or those that are not available for shut down) or a mode of power management such as aggressive, moderate, or none or the like. The generation of the power management plan may account for such user selections by, for example, broadening or narrowing the criteria for a redundancy, keeping certain components unavailable for shut down, or the like.

Any redundancy may be exploited for reduced power consumption. With reference to FIG. 2, for example, a redundancy may be provided between GPS receiver 207 of device 102 and GPS receiver 211 of device 103. Such a redundancy may be associated with a component that provides information for use by the device (e.g., as a sensor). In other examples, the redundancy may be provided by two components that provide communications for device. For example, the redundancy may be between a wired connection and a wireless connection, two Wi-Fi radios, a Wi-Fi radio and a 3G radio, a 3G radio and an LTE radio, two LTE radios, and so on with any combination of communications components able to provide a redundancy within system 100. With continued reference to FIG. 2, a redundancy may be provided among any two or more of wireless radio 202, which may be a Wi-Fi radio, wired communications port 203, which may be an Ethernet port, wireless radio 205, which may be a Wi-Fi radio, wireless radio 206, which may be a 3G radio, wireless radio 209, which may be a Wi-Fi radio, and/or wireless radio 210, which may be an LTE radio. In various examples, the power management plan may shut down, idle, or move to a lower power state one or more of wireless radio 202, wired communications port 203, wireless radio 205, wireless radio 206, wireless radio 209, and/or wireless radio 210. In an embodiment, a single communications connection may be used. For example, a communications connection having a widest bandwidth may be kept active or in a higher power state while others may be shut down or the like. In another embodiment, multiple communications connections may be used such that all applications requiring communications are serviced. For example, some applications may not be able to use all communications connections and the power management plan may take such limitations into account.

In yet other examples, the redundancy may be provided by processing resources. For example, one or more devices may be used for processing and components of other devices may be shut down or idled or moved to a lower power state (e.g., some cores of a multi-core processor may be shut down or idled) or the like. With continued reference to FIG. 2, a redundancy may be provided by two or more of processor 201, which may be a multi-core processor, processor 204, and/or processor 208. As discussed, the power management plan may shut down or the like one or more of processor 201, processor 204, or processor 208. For example, a processor having a greatest processing power may be kept active or in a higher power state while others may be shut down or the like.

In still further examples, the redundancy may be provided by components such as sensors, displays, or speakers, or the like. For example, data or information from one device may be presented to a user via an active display of another device while a display of the first device is kept idle or is shut down. Similarly, in other examples, data or information from one device may be presented to a user via a speaker, a headset, or the like via an active component of another device while a redundant component of the first device is kept idle or is shut down. In other examples, sensors such as microphones, accelerometers, heart rate monitors, or gyroscopes or the like may provide the redundancy. As discussed, in such examples, the sensor may be activated on one device while disabled or shut down on another device while the device having the shut down component may use the active device component to receive data or signals or the like.

In some examples, the power management plan may eliminate the redundancy by disabling one or more of the redundant components. In an embodiment, the power management plan includes a protocol to alternate the component being shut down between one device and another device such that the burden of running the component may be shared over time. For example, at one device the power management plan may alternate a component between a shut down state and an in-use state over time. Such duty cycling may provide longer overall duration for each device involved in the alternating usage plan. In the in-use state, the device may allow access from another device or devices to the in-use component and, in the shut down state, the device may map applications to an in-use component at a remote device. The discussed alternating may be implemented in any suitable manner that shares component resources across system 100 and provides for lower power usage. For example, the alternating may be periodic such that after a duration, the in-use component switches between one or more devices. The duration may be any suitable duration such as, for example, five minutes, fifteen minutes, or a half hour or the like. In some examples, the duration may be different for different devices based on the device types, efficiencies of the components across devices, remaining battery life of the devices, or the like.

Processing may continue at operation 310, "Activate/Deactivate Local Components", where one or more of devices 101, 102, 103 may activate or deactivate local components of the device based on the power management plan. For example, a local component may be a component integral to the device or attached to and under control of the device. As discussed, the power management plan may indicate which components of devices 101, 102, 103 across system 100 may remain activate or may be activated and which components may be shut down or idled or the like to reduce the power consumption of system 100.

Processing may continue at operation 311, "Map Component Application Programming Interfaces (APIs) to Local or Remote Components", where one or more of devices 101, 102, 103 may map component APIs to local or remote components. As discussed, device 102 (for example) of system 100 may shut down a local component and may use a component of device 103 (for example) of system 100 to eliminate a redundancy and reduce the total power consumed by system 100. In such examples, it may be necessary to map the API of device 102 to the component of device 103 (e.g., a remote component). Further, the API of device 103 may map to the component of device 103 (e.g., a local component). Although discussed with respect to an API mapping, any suitable mapping may be provided. Furthermore, the communication of data between or among devices 101, 102, 103 may be provided by one or more of communicative couplings 104, 104, 106 as discussed herein.

In some examples, operation 310 and operation 311 may be provided for non-communications components (e.g., GPS receivers, displays, or sensors or the like). For example, such non-communications components may provide data that may be needed by multiple devices while communications components (e.g., wireless radios and the like) may be used at a single device (e.g., a device the user is interacting with) without the need for other devices to continue using their communications components. For example, a non-communication component such as an active GPS receiver of a device with a display off (e.g., a phone in a pocket) may be needed by a tablet device being viewed and interacted with by a user. In other instances, a communications component such as a Wi-Fi radio may be kept active for a device also with an active display that is being manipulated by a user to check email for example. In such an example, no mapping may be required between devices as the inactive device component may be idled until a later time (e.g., there is no need for the inactive device to also download the same email). Such communications component examples are continued with respect to operation 312 below.

However, in other examples, communication connection components may also be mapped between devices (e.g., via an API or the like). Such mapping(s) may provide flexibility among devices or increased power savings or the like.

Processing may continue at operation 312, "Activate/Deactivate Communication Components(s)", where one or more of devices 101, 102, 103 may activate or deactivate communication component(s) based on the power management plan. For example, redundant communication components may be shut down, idled, or disabled to reduce the total power consumed by system 100. As discussed, redundant communication components may be communication components that provide the same functionality (e.g., communication) although they may include different protocols or standards or the like.

Processing may continue at operation 313, "Set Local Power State", where one or more of devices 101, 102, 103 may be set to a power state based on the power management plan. As discussed, in some examples, component(s) of one or more devices may be shut down or idled based on the power management plan. In other examples, one or more device may be set to a different power state (e.g., a higher or lower power state) based on the power management plan. For example, implementing the power management plan may include placing one or more of devices 101, 102, 103 into a lower power state. The lower power state may include any suitable power state that may reduce the total power consumed by system 100. For example, the lower powers state may include an away mode (e.g., where a display is off but background tasks are running), a power on suspend mode (e.g., where power to the device processor and/or random access memory is maintained but other components are powered off), a processor power off mode, a standby or sleep mode (e.g., where the processor is powered off and RAM remains powered), a hibernation mode (e.g., where the processor is powered off and main memory is saved to non-volatile memory and powered down), or the like.

In various examples, one or more of operations 310, 311, 312, or 313 may be skipped or not applicable in an iteration of process 300. For example, in some iterations no changes may be made, in some iterations only non-communication components may be disabled, in some iterations only communication components may be disabled, in some iterations local power states of various devices may be modified, and in some iterations combinations thereof may be implemented.

As shown, process 300 may continue at decision operation 302, where processing may continue or repeat as discussed above. The operations of process 300 may be repeated any number of times either in series or in parallel at various devices of system 100 to reduce the total power consumed by system 100. Process 300 may be performed by any suitable device or devices that may support one or more of operations 301-313 such as, for example, any of devices 101, 102, 103 of system 100 or any of platform 400, device 600, system 700, or system 800 as discussed herein.

Figure 4:
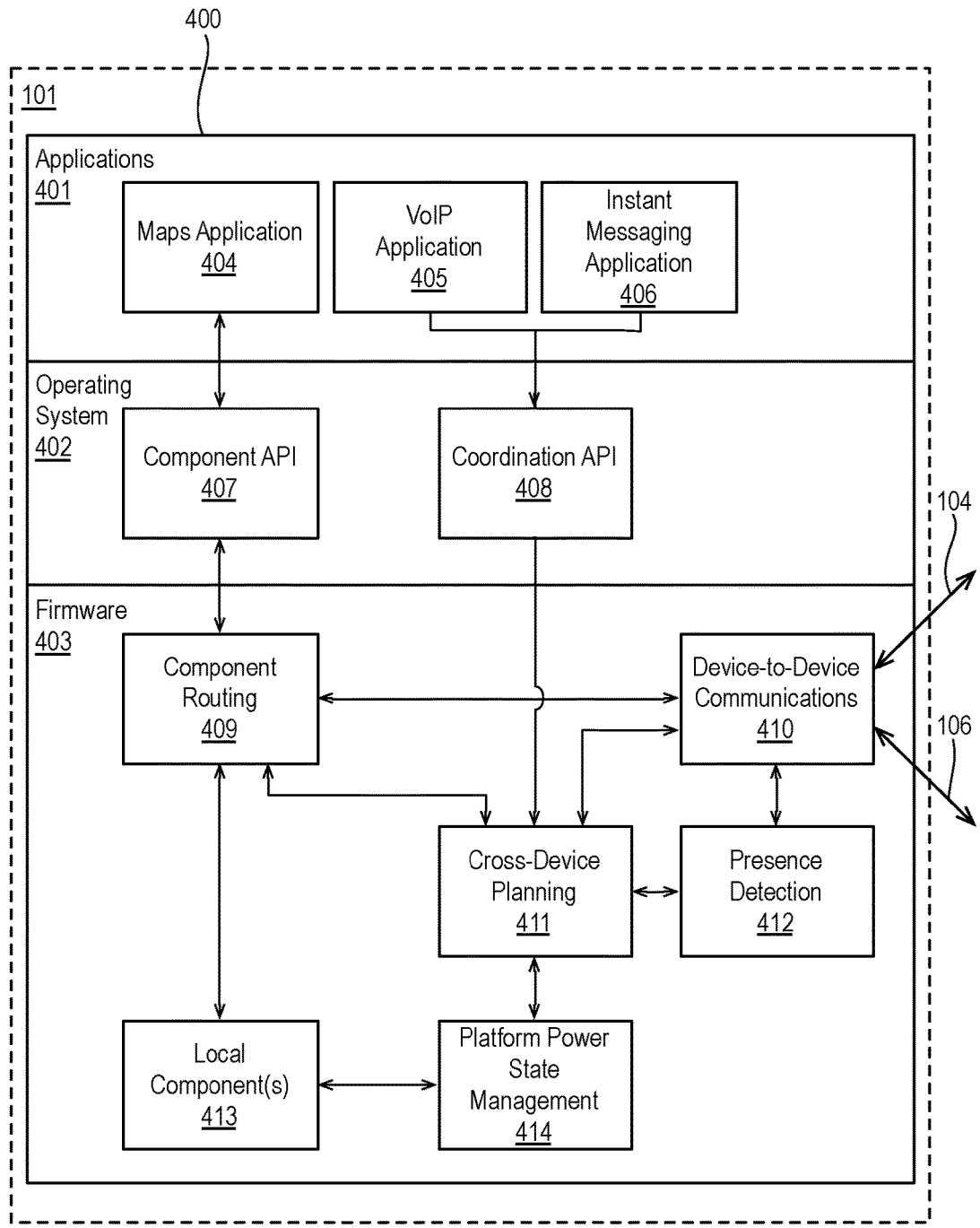
FIG. 4 is a block diagram illustrating an example platform for providing power management across multiple devices.

FIG. 4 is a block diagram illustrating an example platform 400 for providing power management across multiple devices, arranged in accordance with at least some implementations of the present disclosure. As shown in FIG. 4, platform 400 may include applications 401, an operating system 402, and firmware 403. In the illustrated example, platform 400 is implemented via device 101 for the sake of discussion. However, platform 400 may be implemented via device 102, 103 or any other device or system discussed herein. In an embodiment, platform 400 provides a platform for implementing functionalities and/or operations as discussed with respect to FIGS. 1-3 above.

As shown, firmware 403 may include a component routing module 409, a device-to-device communications module 410, a cross-device planning module 411, a presence detection module 412, local component(s) 413, and platform power state management module 414. Firmware 403 may include any suitable memory, program code, and or data for implementing modules 409-413. An implementation via firmware may provide the advantages of fine-grained control over the capabilities of platform 400 and negotiation with other devices in a lower power state. In an example, firmware 403 may be implemented via non-volatile memory such as read only memory (ROM) or the like. Furthermore, as shown, operating system 402 may include a component API module 407 and a coordination API module 408. Operating system 402 may include any suitable software or collection of software that manages firmware 403 and/or other firmware or hardware of platform 400. As shown, operating system 402 may provide an intermediary between applications 401 and firmware 403. Also, as shown, applications 401 may include a maps application 404, a Voice over Internet Protocol (VoIP) application 405, and an instant messaging application 406.

Although illustrated with maps application 404, VoIP application 405, and instant messaging application 406 for the sake of presentation, applications 401 may include any one or more of a wide range of applications that invoke components of platform 400 (e.g., local components 413 and/or remote components via communicative couplings 104, 105) to provide functionality to a user. For example, applications 401 may leverage any component (either locally or remotely) as discussed herein. For example, maps application 404 may leverage a GPS receiver to receive or determine the location of a device and/or to present a location of a device on a map to a user. In another example, VoIP application 405 may use a communications component to deliver and/or receive Internet Protocol (IP) packets including voice or multimedia information. In another example, instant messaging application 406 may use a communications component to deliver and/or receive chat messages in real-time over the Internet. In other examples, applications 401 may include an email application, an Internet browser application, social networking applications, a camera or video application, a fitness tracking application, or any similar application that provides functionality to a user.

As shown, component API module 407 may communicate with one or more of applications 401 and component API module 407 may be used or leveraged by applications 401, such as maps application 404, to use components of platform 400 (e.g., either local components or remote components) to receive information, perform processing request, or the like. For example, component API module 407 may arbitrate the use of components by applications 401 (e.g., multiple applications invoking a particular component) and may hide the underlying component implementation details of the pertinent component such that component API module 407 may provide a library, for example, of routines or the like that may be invoked by applications 401. In an example, component API module 407 may arbitrate the use of non-communication components as discussed herein such as GPS receivers, sensors, and the like.

As shown, coordination API module 408 may communicate with one or more applications 401 and coordination API module 408 may be used or leveraged by applications 401 such as VoIP application 405 and instant messaging application 406 to use components of platform 400 (e.g., either local components or remote components). In some examples, coordination API module 408 may arbitrate and/or coordinate the use of communication components as discussed herein such as communications radios and the like. Furthermore, in some examples, coordination API module 408 may arbitrate and/or coordinate the use of power state and/or power management information of platform 400. For example, an application such as VoIP application 405 or instant messaging application 406 may register its application type (e.g., VoIP, instant messaging, email, Internet browser, or the like) and interest in information available via coordination API module 408. In implementing a power management plan, platform 400 may, via coordination API module 408, provide the needed components (e.g., communications components) to ensure each application may receive the information or functionality it needs to operate.

Furthermore, as shown, cross-device planning module 411 may be in communication with component routing module 409, coordination API module 408, device-to-device communications module 410, presence detection module 412, and platform power state management module 414. Cross-device planning module 411 may inventory components and/or resources of devices 102, 103 via communicative couplings 104, 106 as discussed herein. For example, device-to-device communications module 410 may provide for communications between device 101 and devices 102, 103 over communicative couplings 104, 106 based on any communications channel as discussed herein such as a wireless local area network, personal area network, or body area network). Furthermore, presence detection module 412 may enable device 101 to determine other user devices or shared devise are available and nearby. For example, presence detection module 412 may implement a discovery protocol and/or access protocol to detect devices 102, 103 and/or to allow pairing device 101 with devices 102, 103.

In an example, based on the inventory and a resource planning technique (either distributed or centralized, as discussed), cross-device planning module 411 may generate a power management plan in any manner as discussed herein. In another example, cross-device planning module 411 may receive the described inventory and generate the power management plan. In yet another example, cross-device planning module 411 may send the described inventory to another device and receive the power management plan for implementation.

Continuing with platform 400, component routing module 409 may be in communication with component API module 407, local components 413, cross-device planning module 411, and device-to-device communications module 410. Component routing module 409 may map components (e.g., non-communications components) made available via component API module 407 to either local components 413 (e.g., locally available components) or to components shared from devices 102, 103 via communicative coupling 104 or communicative coupling 106 (please refer to FIG. 1) based on the power management plan generated and/or implemented via cross-device planning module 411.

Furthermore, platform power state management module 414 may be in communication with cross-device planning module 411 and local component 413. Platform power state management module 414 may manage the power state of device 101. For example, platform power state management module 414 may enter device 101 into a lower power state based on the power management plan implemented via cross-device planning module 411. Furthermore, platform power state management module 414 may shut down, disable, or place into a lower power state local component 413 based on the power management plan implemented via cross-device planning module 411. For example, component 413 may include a GPS receiver, communication components such as radios, or sensors or the like as discussed herein.

As discussed, platform 400 may enable power management across multiple devices as discussed herein. For example, platform 400 may implement the operations of process 300 as follows (with reference to FIGS. 3 and 4). At decision operation 302, "Multi-Device Power Management Trigger", a multi-device power management trigger may be detected via platform power state management module 414. At operation 303, "Enter Active Power State", platform power state management module 414 may enter device 101 into an active power state. At operation 304, "Enable Device-to-Device Communication", device-to-device communications module 410 may enable device-to-device communications between device 101 and devices 102, 103. At operation 305, "Identify and Connect to Available Device(s)", presence detection module 412, via device-to-device communications module 410, may identify and connect device 101 to, for example, devices 102, 103. In such a manner, device 101 may, in response to a multi-device power management trigger, establish communicative couplings 104, 106 with devices 102, 103.

At operations 306, "Inventory Device Component(s)", 307, "Identify Applications Using Component(s)", and 308, "Determine Device Resources", cross-device planning module 411, via device-to-device communications module 410 may inventory remote components and/or resources of devices 102,103, and, via local components 413, component routing module 409, component API module 407, and/or coordination API module 408, may inventory local components and/or resources of device 101. Furthermore, cross-device planning module 411, via device-to-device communications module 410, may describe local components and/or resources of device 101 to devices 102, 103 (for their inventory and power management plan, if needed).

Based on the inventory of components and/or resources, at operation 309, "Generate Power Management Plan", cross-device planning module 411 may generate a power management plan. At operations 310, "Activate/Deactivate Local Components" and 311 "Map Component Application Programming Interfaces (APIs) to Local or Remote Components", platform power state management module 414 may activate or deactivate local components based on the power management plan, and component routing module 409 may route component API module 407 to the local or remote components based on the power management plan. For example, operations 309 and 310 may be performed for non-communications components.

At operation 312, "Activate/Deactivate Communication Components(s)", platform power state management module 414 may activate or deactivate local communications components based on the power management plan. At operation 313, "Set Local Power State", power state management module 414 may set the local power state of device 101 based on the power management plan. The described operations may be repeated any number of times via platform 400 to lower power consumption across system 100, to avoid using a device low on remaining battery life, to use a device having a high efficiency component, or the like as discussed herein.

Figure 5:
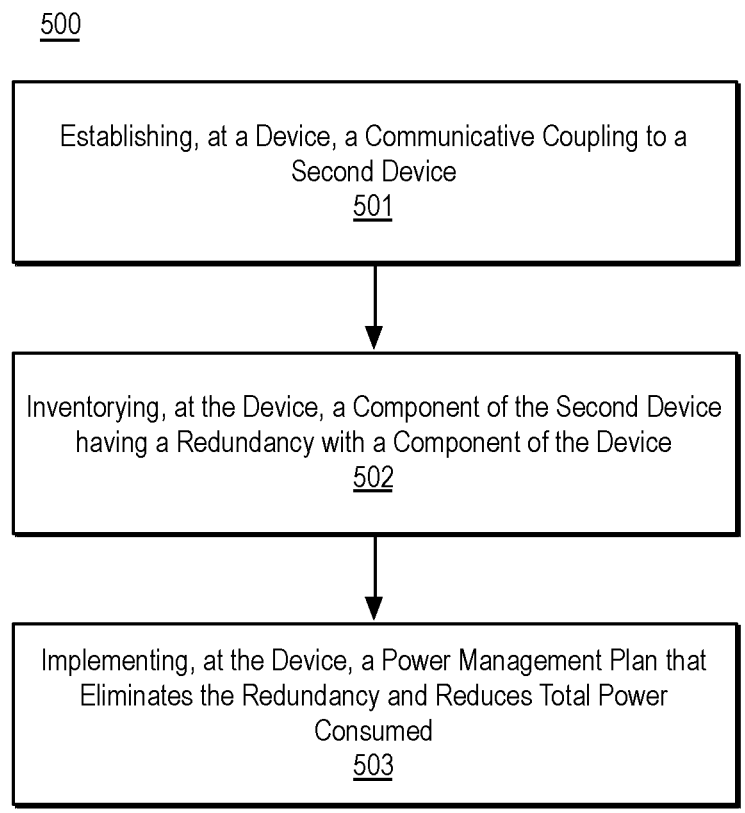
FIG. 5 is a flow diagram illustrating an example process for providing power management across multiple devices.

FIG. 5 is a flow diagram illustrating an example process 500 for providing power management across multiple devices, arranged in accordance with at least some implementations of the present disclosure. Process 500 may include one or more operations 501-503 as illustrated in FIG. 5. Process 500 may form at least part of a process for providing power management. By way of non-limiting example, process 500 may form at least part of process for reducing the total power consumed by system 100 as discussed herein. Further, process 500 will be described herein in reference to device 600 of FIG. 6.

Figure 6:
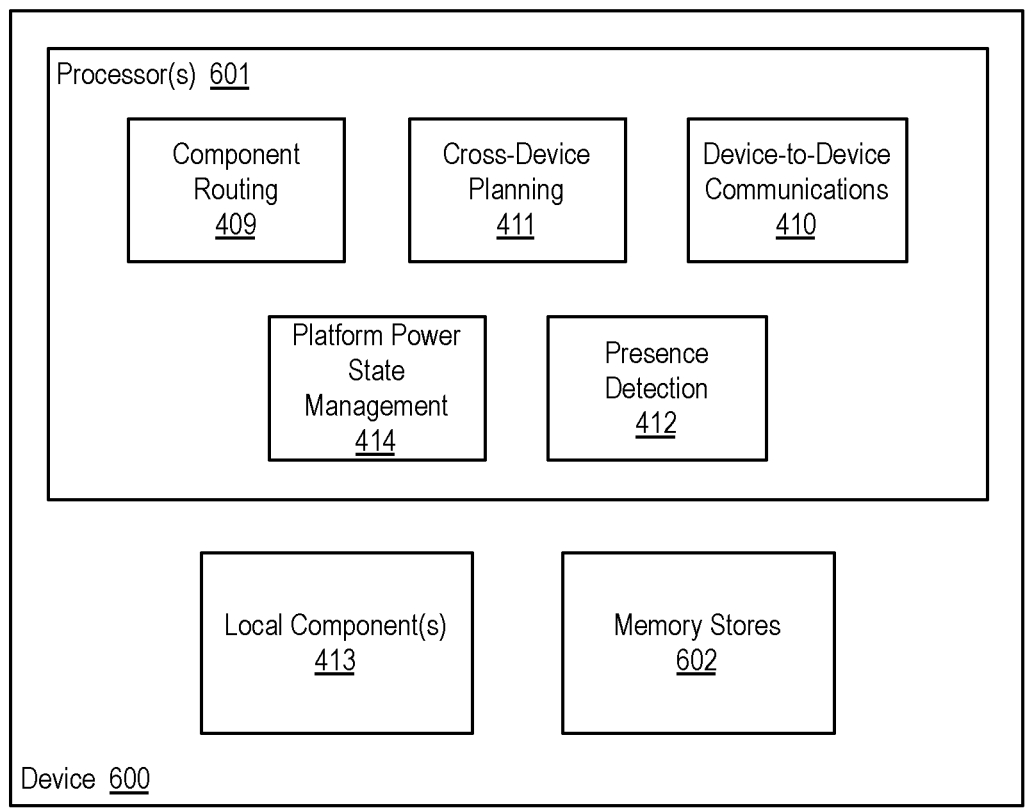
FIG. 6 is an illustrative diagram of an example device for providing power management across multiple devices.

FIG. 6 is an illustrative diagram of an example device 600 for providing power management across multiple devices, arranged in accordance with at least some implementations of the present disclosure. As shown in FIG. 6, device 600 may include one or more processor(s) 601 and memory stores 603. Also, as shown, processor(s) 601 may include component routing module 409, cross-device planning module 411, device-to-device communications module 410, platform power state management module 414, and presence detection module 412. Furthermore, device 600 may include local component(s) 413. In the example of device 600, memory stores 603 may be configured to store a power management plan and/or an inventory including an inventory of components and/or resources of devices in a multi-device system as discussed herein. Although not shown in FIG. 6, in some examples, device 600 may include a display device for the presentment of content to a user, a microphone, a speaker, or other components as discussed herein.

Device 600 may include any suitable device or system as discussed with respect to FIGS. 1-4 and elsewhere herein such as, for example, a computer, a laptop, or a mobile device such as a smartphone, ultrabook, or tablet, or the like. As shown, in some examples, component routing module 409, cross-device planning module 411, device-to-device communications module 410, platform power state management module 414, and presence detection module 412 may be implemented via processor(s) 601. In other examples, one, some or all of component routing module 409, cross-device planning module 411, device-to-device communications module 410, platform power state management module 414, and presence detection module 412 may be implemented via other circuitry of device 600 such as an execution unit (EU) or fixed function circuitry. An EU may include, for example, programmable logic or circuitry such as a logic core or cores that may provide a wide array of programmable logic functions. Fixed function circuitry may include dedicated logic or circuitry and may provide a set of fixed function entry points that may map to the dedicated logic for a fixed purpose or function. Furthermore, a portion of device-to-device communications module 410 may be implemented via dedicated communications circuitry.

Processor(s) 601 may include any number and type of processing units or modules that may provide control and other high level functions for device 600 and/or any of the operations as discussed herein. Memory stores 602 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 602 may be implemented by cache memory. For example, memory stores 602 may be configured to store an inventory or a power management plan or any other data as discussed herein.

Returning to discussion of FIG. 5, process 500 may begin at operation 501, "Establishing, at a Device, a Communicative Coupling to a Second Device", where a device may establish a communicative coupling to a second device. For example, device 600 may establish a communicative coupling via device-to-device communications module 410 with a second device in a multi-device setting. In another example, any of devices 101, 102, 103 may establish a communicative coupling with any other of devices 101, 102, 103. The communicative coupling may include any techniques as discussed herein. In an example, establishing the communicative coupling may be in response to a power management trigger (e.g., a periodic trigger, a user initiated trigger, or a device change trigger) and/or entering an active power state in response to the power management trigger. In some examples, establishing the communicative coupling may include discovering, via presence detection module 412, the second device via a discovery protocol and/or pairing device 600 with the second device.

Process 500 may continue at operation 502, "Inventorying, at the Device, a Component of the Second Device having a Redundancy with a Component of the First Device", where the device may inventory component(s) of the second device such that one or more of the components of the second device has a redundancy with one or more respective components of the device. For example, device 600, via cross-device planning module 411, may inventory components of a second device such that a component of the second device has a redundancy with a component of the device. In some examples, the device may also inventory one or more resources of the second device as discussed herein. In another example, any device of devices 101, 102, 103 may inventory the components and/or resources of any other device of devices 101, 102, 103. The inventory may include a component of the second device having any redundancy with a component of the device as discussed herein.

Process 500 may continue at operation 503, "Implementing, at the Device, a Power Management Plan that Eliminates the Redundancy and Reduces Total Power Consumed", where the device may implement a power management plan that eliminates the redundancy and reduces a total power consumed by multiple devices. For example, device 600, via cross-device planning module 411 may generate a power management plan and, via platform power state management module 414, may implement the power management plan. For example, platform power state management module 414 may be configured to shut down the redundant component of device 600 or enter device 600 into a lower power state. Furthermore, device-to-device communications module 410 may be configured to transmit the power management plan to any other device as discussed herein. Also, in the example of a local component being shut down or idled, component routing module 409 may be configured to map a remote component (e.g., a component of another device) to device 600 via device-to-device communications module 410 and a communicative coupling. In another example, any of devices 101, 102, 103 may generate and/or implement a power management plan that eliminates the redundancy and reduces a total power consumed by multiple devices.

The operations of process 500 may be repeated any number of times to provide power management across multiple devices. Furthermore, the operations of process 500 may be combined with other operations discussed herein and, in particular, those discussed with respect to process 300.

Various components of the systems described herein may be implemented in software, firmware, and/or hardware and/or any combination thereof. Furthermore, the various components may be implemented via any suitable circuitry. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes (e.g., process 300 or process 500) discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems, or any other module, circuitry, or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 7:
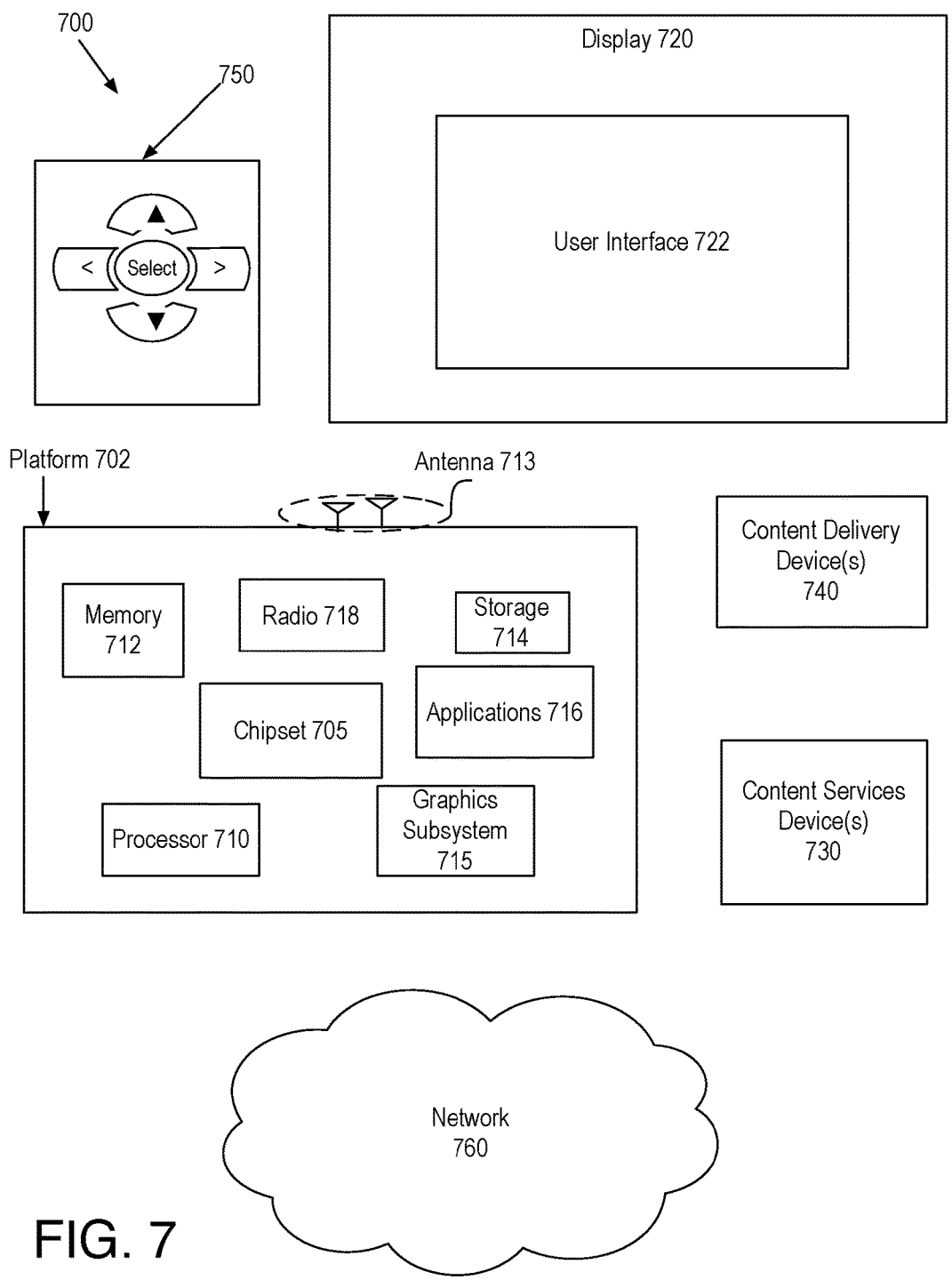
FIG. 7 is an illustrative diagram of an example system.

FIG. 7 is an illustrative diagram of an example system 700, arranged in accordance with at least some implementations of the present disclosure. In various implementations, system 700 may be a mobile device or system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, antenna 713, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone device communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of uni-directionally or bi-directionally communicating content between content providers and platform 702 and/display 720, via network 760 or directly. It will be appreciated that the content may be communicated uni-directionally and/or bi-directionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In various embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In various embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
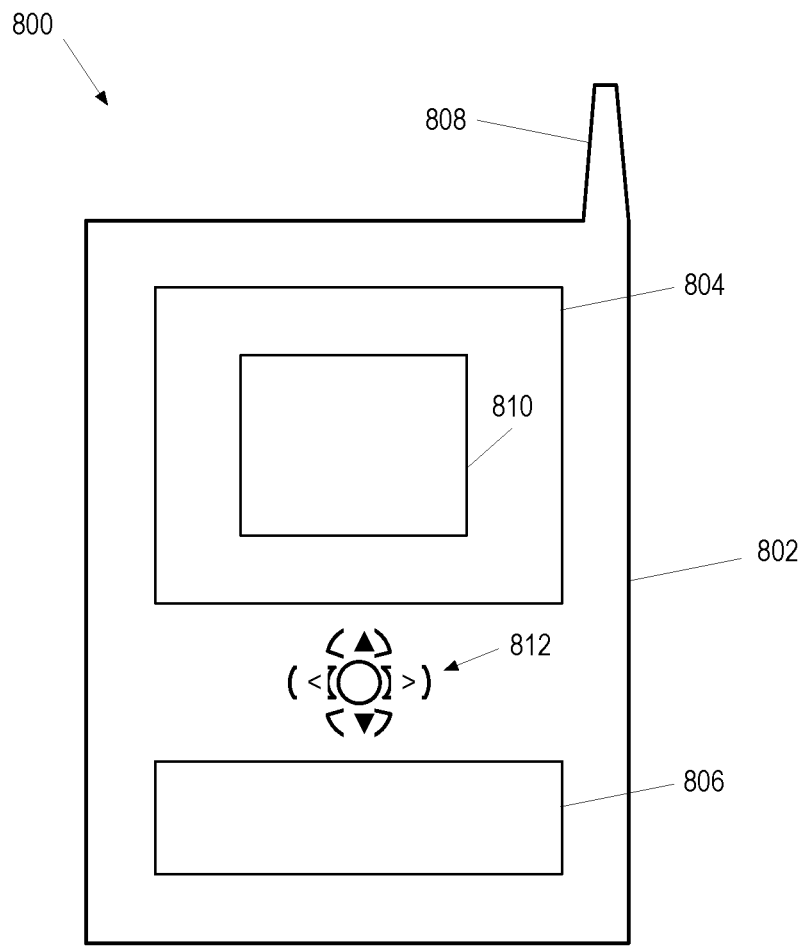
FIG. 8 illustrates an example device, all arranged in accordance with at least some implementations of the present disclosure.

As described above, system 700 may be embodied in varying physical styles or form factors. FIG. 8 illustrates implementations of a small form factor device 800 in which system 800 may be embodied. In various embodiments, for example, device 800 may be implemented as a mobile computing device as having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for providing power management across a plurality of devices comprises establishing, at a first device, a communicative coupling to a second device, inventorying, at the first device, a component of the second device having a redundancy with a component of the first device, and implementing, at the first device, a power management plan for the first device and the second device that eliminates the redundancy and reduces total power consumed by the plurality of devices.

Further to the first embodiments, implementing the power management plan comprises at least one of shutting down the component of the first device or placing the first device into a lower power state.

Further to the first embodiments, the method further comprises inventorying, at the first device, one or more resources of the second device and generating the power management plan based at least in part on the one or more resources of the second device.

Further to the first embodiments, the method further comprises inventorying, at the first device, one or more resources of the second device and generating the power management plan based at least in part on the one or more resources of the second device, and the one or more resources comprise at least one of a remaining battery life of the second device, a device type of the second device, or an efficiency of the second device associated with the component of the second device.

Further to the first embodiments, the method further comprises inventorying, at the first device, one or more resources of the second device and generating the power management plan based at least in part on the one or more resources of the second device, and generating the power management plan is based on a distributed resource planning technique configured to be performed by any of the plurality of devices.

Further to the first embodiments, the method further comprises entering an active power state at the first device in response to a power management trigger, wherein the power management trigger comprises at least one of a periodic trigger, a user initiated trigger, or a device change trigger.

Further to the first embodiments, the method further comprises transmitting, from the first device, the power management plan to the second device.

Further to the first embodiments, the power management plan comprises shutting down the component of the first device and the method further comprises mapping, at the first device, the component of the second device to the first device via the communicative coupling to allow the first device to access the component of the second device.

Further to the first embodiments, establishing the communicative coupling to the second device comprises discovering, at the first device, the second device via a discovery protocol and pairing the first device to the second device, and wherein the communicative coupling comprises at least one of a peer-to-peer communications channel, a local area network, a personal area network, or a body area network.

Further to the first embodiments, the power management plan comprises a protocol to alternate the component of the first device between a shut down state and an in-use state, and wherein, in the in-use state, the first device allows access to the component of the first device by the second device.

Further to the first embodiments, the component of the first device comprises a first type of wireless radio and the component of the second device comprises a second type of wireless radio, wherein the second type of wireless radio has a greater bandwidth than the first type of wireless radio, and wherein the power management plan comprises shutting down the component of the first device.

Further to the first embodiments, the first device comprises at least one of a smartphone, a tablet, an ultrabook, or a laptop, and wherein the component of the first device comprises at least one of a global position system receiver, a sensor, a communications radio, or a processing resource.

In one or more second embodiments, a device for providing power management across a plurality of devices comprises a memory configured to store a power management plan and a processor coupled to the memory, wherein the processor comprises device-to-device communications circuitry configured to establish a communicative coupling to a second device, cross-device planning circuitry configured to inventory a component of the second device having a redundancy with a component of the device and to generate the power management plan for the device and the second device, and platform power state management circuitry configured to implement the power management plan to eliminate the redundancy and reduce total power consumed by the plurality of devices.

Further to the second embodiments, the platform power state management circuitry being configured to implement the power management plan comprises the platform power state management circuitry being configured to shut down the component of the device or place the device into a lower power state.

Further to the second embodiments, the cross-device planning circuitry is further configured to inventory one or more resources of the second device and to generate the power management plan based at least in part on the one or more resources of the second device.

Further to the second embodiments, the cross-device planning circuitry is further configured to inventory one or more resources of the second device and to generate the power management plan based at least in part on the one or more resources of the second device and the cross-device planning circuitry is configured to generate the power management plan based on a distributed resource planning technique configured to be performed by any of the plurality of devices.

Further to the second embodiments, the cross-device planning circuitry is further configured to inventory one or more resources of the second device and to generate the power management plan based at least in part on the one or more resources of the second device, wherein the cross-device planning circuitry is configured to generate the power management plan based on a distributed resource planning technique configured to be performed by any of the plurality of devices.

Further to the second embodiments, the platform power state management circuitry is further configured to enter the device into an active power state in response to a power management trigger, wherein the power management trigger comprises at least one of a periodic trigger, a user initiated trigger, or a device change trigger.

Further to the second embodiments, the device-to-device communications circuitry is further configured to transmit the power management plan to the second device.

Further to the second embodiments, the device further comprises component routing circuitry configured to map the component of the second device to the device via the communicative coupling to allow the device to access the component of the second device.

Further to the second embodiments, the platform power state management circuitry is further configured to enter the device into an active power state in response to a power management trigger, wherein the power management trigger comprises at least one of a periodic trigger, a user initiated trigger, or a device change trigger.

Further to the second embodiments, the power management plan comprises a protocol to alternate the component of the first device between a shut down state and an in-use state.

In one or more third embodiments, a device for providing power management across a plurality of devices comprises a memory configured to store a power management plan and a processor coupled to the memory, wherein the processor comprises means for establishing, at a first device, a communicative coupling to a second device, means for inventorying, at the first device, a component of the second device having a redundancy with a component of the first device, and means for implementing, at the first device, a power management plan for the first device and the second device that eliminates the redundancy and reduces total power consumed by the plurality of devices.

Further to the third embodiments, the device further comprises means for transmitting, from the first device, the power management plan to the second device.

Further to the third embodiments, the power management plan comprises a protocol to alternate the component of the first device between a shut down state and an in-use state, and wherein, in the in-use state, the first device allows access to the component of the first device by the second device.

In one or more fourth embodiments, at least one machine readable medium comprises a plurality of instructions that in response to being executed on a computing device, cause the computing device to provide power management across a plurality of devices by establishing, at a first device, a communicative coupling to a second device, inventorying, at the first device, a component of the second device having a redundancy with a component of the first device, and implementing, at the first device, a power management plan for the first device and the second device that eliminates the redundancy and reduces total power consumed by the plurality of devices.

Further to the fourth embodiments, implementing the power management plan comprises at least one of shutting down the component of the first device or placing the first device into a lower power state.

Further to the fourth embodiments, the machine readable medium further comprises instructions that in response to being executed on a computing device, cause the computing device to provide power management across a plurality of devices by inventorying, at the first device, one or more resources of the second device and generating the power management plan based at least in part on the one or more resources of the second device, wherein the one or more resources comprise at least one of a remaining battery life of the second device, a device type of the second device, or an efficiency of the second device associated with the component of the second device.

Further to the fourth embodiments, the machine readable medium further comprises instructions that in response to being executed on a computing device, cause the computing device to provide power management across a plurality of devices by inventorying, at the first device, one or more resources of the second device and generating the power management plan based at least in part on the one or more resources of the second device, wherein the one or more resources comprise at least one of a remaining battery life of the second device, a device type of the second device, or an efficiency of the second device associated with the component of the second device, wherein generating the power management plan is based on a distributed resource planning technique configured to be performed by any of the plurality of devices.

Further to the fourth embodiments, generating the power management plan is based on a distributed resource planning technique configured to be performed by any of the plurality of devices.

Further to the fourth embodiments, the machine readable medium further comprises instructions that in response to being executed on a computing device, cause the computing device to provide power management across a plurality of devices by transmitting, from the first device, the power management plan to the second device.

Further to the fourth embodiments, the machine readable medium further comprises instructions that in response to being executed on a computing device, cause the computing device to provide power management across a plurality of devices by mapping, at the first device, the component of the second device to the first device via the communicative coupling to allow the first device to access the component of the second device.

In on or more fifth embodiments, at least one machine readable medium may include a plurality of instructions that in response to being executed on a computing device, causes the computing device to perform a method according to any one of the above embodiments.

In on or more sixth embodiments, an apparatus may include means for performing a method according to any one of the above embodiments.

It will be recognized that the invention is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. A device for providing power management across a plurality of devices, comprising:
   a memory; and
   a processor coupled to the memory, the processor to:
   establish a communicative coupling to a second device;
   inventory a component of the second device having a redundancy with a component of the device;

eliminate the redundancy to reduce total power consumed by the plurality of devices; and map the component of the second device to the device via the communicative coupling to allow the device to access the component of the second device.

2. The device of claim 1, wherein the processor to eliminate the redundancy comprises the processor to shut down the component of the device or place the device into a lower power state.

3. The device of claim 1, wherein the processor is further to inventory one or more resources of the second device and to generate a power management plan based at least in part on the one or more resources of the second device, wherein the power management plan comprises the processor to eliminate the redundancy.

4. The device of claim 3, wherein the one or more resources comprise at least one of a remaining battery life of the second device, a device type of the second device, or an efficiency of the second device associated with the component of the second device.

5. The device of claim 3, wherein the processor is further to generate the power management plan based on a distributed resource planning technique configured to be performed by any of the plurality of devices.

6. The device of claim 3, wherein the power management plan comprises a protocol to alternate the component of the device between a shut down state and an in-use state, and wherein, in the in-use state, the device allows access to the component of the device by the second device.

7. The device of claim 1, wherein the processor is further to enter the device into an active power state in response to a power management trigger, wherein the power management trigger comprises at least one of a periodic trigger, a user initiated trigger, or a device change trigger.

8. At least one non-transitory machine readable medium comprising a plurality of instructions that, in response to being executed on a device, cause the device to provide power management across a plurality of devices by:

establishing a communicative coupling to a second device;

inventorying a component of the second device having a redundancy with a component of the device;

eliminating the redundancy to reduce total power consumed by the plurality of devices; and mapping the component of the second device to the device via the communicative coupling to allow the device to access the component of the second device.

9. The non-transitory machine readable medium of claim 8, wherein eliminating the redundancy comprises shutting down the component of the device or placing the device into a lower power state.

10. The non-transitory machine readable medium of claim 8, further comprising instructions that, in response to being executed on the device, cause the device to provide power management across the plurality of devices by:

inventorying one or more resources of the second device; and generating a power management plan based at least in part on the one or more resources of the second device, wherein the power management plan comprises elimination of the redundancy.

11. The non-transitory machine readable medium of claim 10, wherein the one or more resources comprise at least one of a remaining battery life of the second device, a device type of the second device, or an efficiency of the second device associated with the component of the second device.

12. The non-transitory machine readable medium of claim 10, wherein the power management plan comprises a protocol to alternate the component of the device between a shut down state and an in-use state, and wherein, in the in-use state, the device allows access to the component of the device by the second device.

13. The non-transitory machine readable medium of claim 8, further comprising instructions that, in response to being executed on the device, cause the device to provide power management across the plurality of devices by:

entering the device into an active power state in response to a power management trigger, wherein the power management trigger comprises at least one of a periodic trigger, a user initiated trigger, or a device change trigger.

14. A device implemented method for power management across a plurality of devices comprising:

establishing a communicative coupling to a second device;

inventorying a component of the second device having a redundancy with a component of the device;

eliminating the redundancy to reduce total power consumed by the plurality of devices; and mapping the component of the second device to the device via the communicative coupling to allow the device to access the component of the second device.

15. The device implemented method of claim 14, wherein eliminating the redundancy comprises shutting down the component of the device or placing the device into a lower power state.

16. The device implemented method of claim 14, further comprising:

inventorying one or more resources of the second device; and generating a power management plan based at least in part on the one or more resources of the second device, wherein the power management plan comprises elimination of the redundancy.

17. The device implemented method of claim 16, wherein the one or more resources comprise at least one of a remaining battery life of the second device, a device type of the second device, or an efficiency of the second device associated with the component of the second device.

18. The device implemented method of claim 16, wherein the power management plan comprises a protocol to alternate the component of the device between a shut down state and an in-use state, and wherein, in the in-use state, the device allows access to the component of the device by the second device.

19. The device implemented method of claim 14, further comprising:

entering the device into an active power state in response to a power management trigger, wherein the power management trigger comprises at least one of a periodic trigger, a user initiated trigger, or a device change trigger.

* * * * *